United States Patent

Nakada et al.

[11] Patent Number: 5,845,895
[45] Date of Patent: Dec. 8, 1998

[54] LIQUID SEALED RUBBER MOUNT

[75] Inventors: Kuniaki Nakada, Yokohama; Hikosaburou Hiraki, Oyama, both of Japan

[73] Assignee: Kabushiki Kaisha Komatsu Seisakusho, Tokyo, Japan

[21] Appl. No.: 596,356
[22] PCT Filed: Dec. 9, 1993
[86] PCT No.: PCT/JP93/01782
  § 371 Date: Mar. 8, 1996
  § 102(e) Date: Mar. 8, 1996
[87] PCT Pub. No.: WO95/07419
  PCT Pub. Date: Mar. 16, 1995

[30] Foreign Application Priority Data

Sep. 8, 1993 [JP] Japan .................................. 5-053628

[51] Int. Cl.$^6$ ............................ F16F 13/00; B62D 33/067
[52] U.S. Cl. .................. 267/140.13; 267/294; 267/141.4
[58] Field of Search ........................... 267/33, 35, 140.11, 267/140.13, 140.3, 140.4, 141.1, 141.4, 152, 153, 293, 294; 248/558, 562, 635, 636

[56] References Cited

U.S. PATENT DOCUMENTS

| 2,126,707 | 8/1938 | Schmidt | 267/141.1 |
| 3,698,703 | 10/1972 | Hipsher | 267/140.12 |
| 3,806,106 | 4/1974 | Hamel et al. | 267/292 |
| 4,032,125 | 6/1977 | Minakawa et al. | 267/294 |
| 4,399,987 | 8/1983 | Cucelli et al. | 267/35 |
| 4,921,049 | 5/1990 | Kaiser et al. | 267/140 |
| 5,127,636 | 7/1992 | Spaltofski | 248/562 |
| 5,257,730 | 11/1993 | Nakauna | 267/140.3 |
| 5,330,165 | 7/1994 | van Goubergen | 267/141 |
| 5,433,423 | 7/1995 | Whightsil | 267/35 |
| 5,516,176 | 5/1996 | Kimoto et al. | 267/140.13 |

FOREIGN PATENT DOCUMENTS

| 63-266242 | 11/1988 | Japan . |
| 63-275827 | 11/1988 | Japan . |
| 64-12946 | 1/1989 | Japan . |
| 1-295046 | 11/1989 | Japan . |
| 4-101835 | 9/1992 | Japan . |
| 6-28378 | 4/1994 | Japan . |
| 93/09302 | 5/1993 | WIPO . |

*Primary Examiner*—Chris Schwartz
*Attorney, Agent, or Firm*—Sidley & Austin

[57] ABSTRACT

This invention relates to a liquid sealed rubber mount capable of displaying an excellent vibration isolating effect in intermediate and high frequency ranges, having a vibration isolating effect with no resonation occurring with respect to even the impact vibration of a wide frequency band, capable of obtaining a large attenuation force for large amplitude vibration, and capable of preventing the occurrence of lateral vibration. Accordingly, a case (11, 51) and a guide shaft (14) are joined to each other by a cylindrical rubber mounting element (17, 58), and a high attenuation liquid (21, 59) is sealed in a liquid sealing chamber housing (20, 53) fixed to a lower end of the case (11, 51), a damper plate (23, 28, 55) being held on a lower end of the guide shaft (14). An elastic member (24, 26, 34, 35, 36a, 36b, 39, 56), which is deformed finely by the distance a due to the resistance of the high attenuation liquid (21, 59) when vertical vibration occurs, is fixed the damper plate (23, 28, 55). When intermediate and high frequency vibration, the amplitude of which is not more than ±a, occurs, the elastic member (24, 26, 34, 35, 36a, 36b, 39, 56) is deformed and is not attenuated, and a vibration isolating action occurs owing to the rubber mounting element (17, 58). When low frequency vibration, the amplitude of which is in excess of ±a, occurs, the damper plate (23, 28, 55) and elastic member (24, 26, 34, 35, 36a, 36b, 39, 56) are moved unitarily, and an attenuation force occurs. The cylindrical rubber mounting element (58) can be a cylindrically laminated structure provided with one or more cylindrical laminate plates (57) positioned therein.

18 Claims, 12 Drawing Sheets

LIQUID SEALED RUBBER MOUNT

TECHNICAL FIELD

This invention relates to a liquid sealed rubber mount for vibration isolating action and, in particular, to a liquid sealed rubber mount suitable for mounting an operating cabin or cab on a body for preventing the occurrence of vibration.

BACKGROUND OP THE INVENTION

Figure 1:
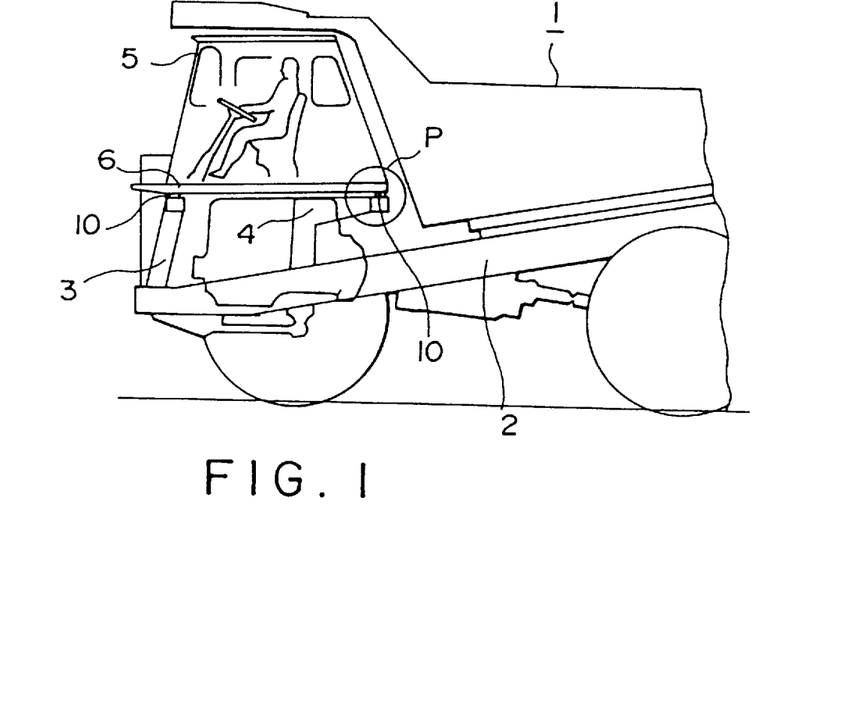
FIG. 1 is a schematic view showing a general structure of a dump truck on which a cab has been mounted.
Figure 2:
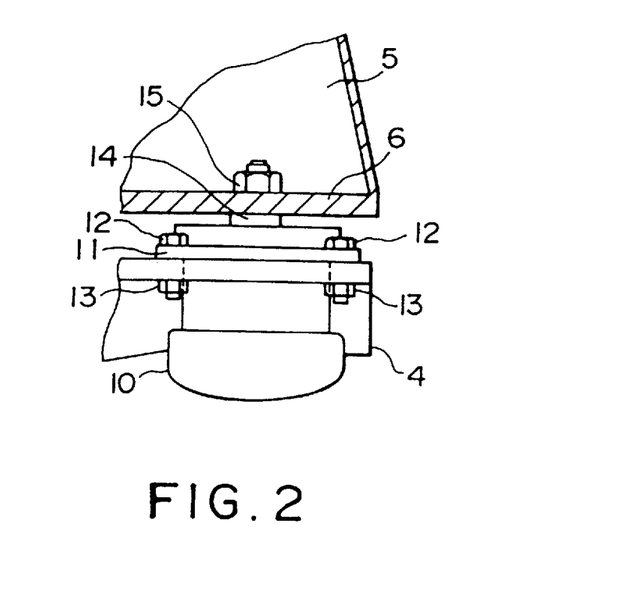
FIG. 2 is a detailed view of a portion P of FIG. 1, showing a mounting portion of the cab.

A rubber mount includes a shock absorbing member, e.g., made of rubber, between a vibration source such as a car body and a vibration receiving object such as a cab, for reducing vibration of the cab with a vibration isolating effect. A description will be made at first with respect to a common dump truck with reference to FIG. 1, showing, a general structure of the dump truck on which the cab is mounted. In FIG. 1, brackets 3 and 4 are fixed to a frame 2 of the dump truck 1, on which a floor 6 of the cab 5 is mounted through a vibration isolating mount 10 so as to prevent the vibration from being directly transmitted to the cab 5 from a road surface or the like. FIG. 2 is a partial detail of the part P shown in FIG. 1, in which a case 11 of the vibration isolating mount 10 is fastened to the bracket 4 with bolts 12 and nuts 13. A guide shaft 14 of the vibration isolating mount 10 is then tightened to the floor 6 with a nut 15 so as to mount the cab 5 thereon for preventing the occurrence of vibration.

Figure 19:
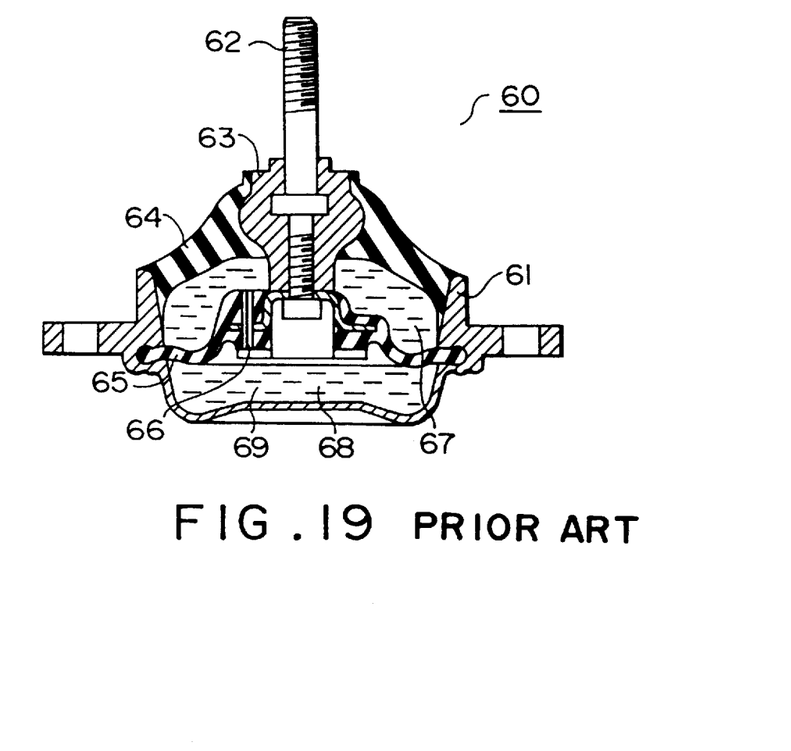
FIG. 19 is a sectional side view of a conventional liquid sealed mount.

FIG. 19 is a sectional side view of a conventional liquid sealed mount (e.g., see Japanese utility model laid-open publication No. 64-12946) which is often used in the art as a rubber mount. In the liquid sealed mount 60, a case 61 and a boss 63, having a bolt 62, are joined to each other by the rubber mounting element 64. A rubber diaphragm 65, having an orifice 66 therein, is held on a lower end of the boss 63, the circumference of which is fixed to the case 61. The rubber diaphragm 65 divides the case 61 into a chamber 67 and a chamber 68. A liquid is then sealed in both the chamber 67 and the chamber 68 in communication with each other through the orifice 66. When a vertical vibration load is applied, the relative displacement of the case 61 and the boss 63 occurs while deforming the rubber mounting element 64. At this moment, the liquid 69 moves between the chamber 67 and the chamber 68 through the orifice 66 so that the vibration can be attenuated by the power of the resistance of the liquid passing through the orifice 66.

Figure 22:
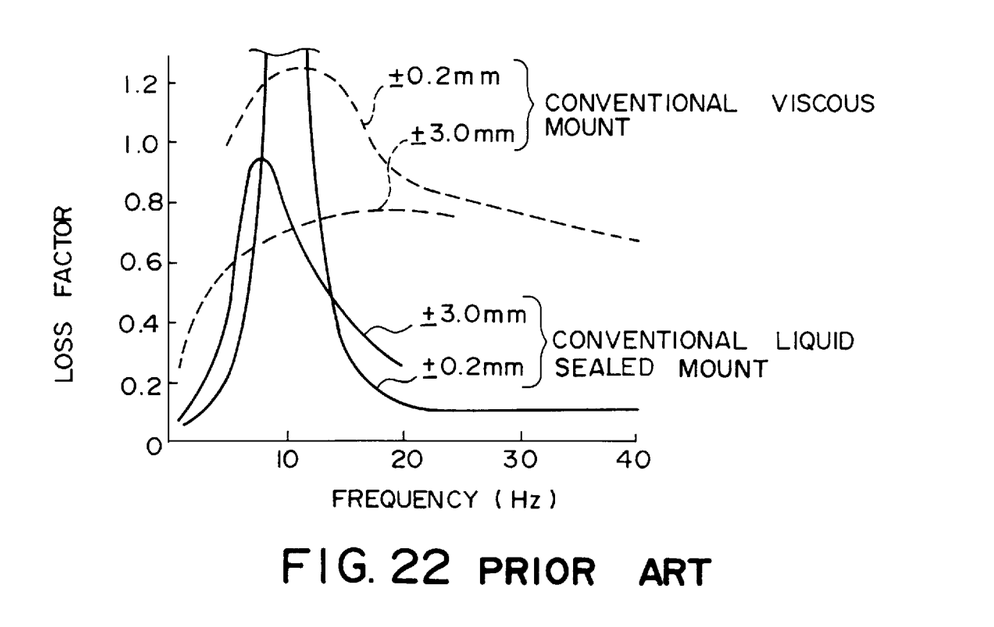
FIG. 22 is a graph showing attenuation characteristics of the conventional liquid sealed mount.

The attenuation characteristics of such a liquid sealed mount 60, which depend upon the diameter or the passing flow rate of the orifice, are shown in FIG. 22. In that drawing, the solid lines indicate the characteristics of the liquid sealed mount 60, each exhibiting a relationship between frequency and loss factor for an input amplitude of ±0.2 mm or ±3.0 mm. As shown in FIG. 22, an excellent vibration isolating effect can be obtained in certain frequency ranges across a frequency of 10 Hz, whereas the loss factor values are small in the other frequency ranges, such that resonation is induced with respect to the input vibration, such as the impact vibration of a wide frequency band, with no vibration isolating effect. Further, lateral vibration can occur due to the lack of any lateral attenuation action.

Figure 20:
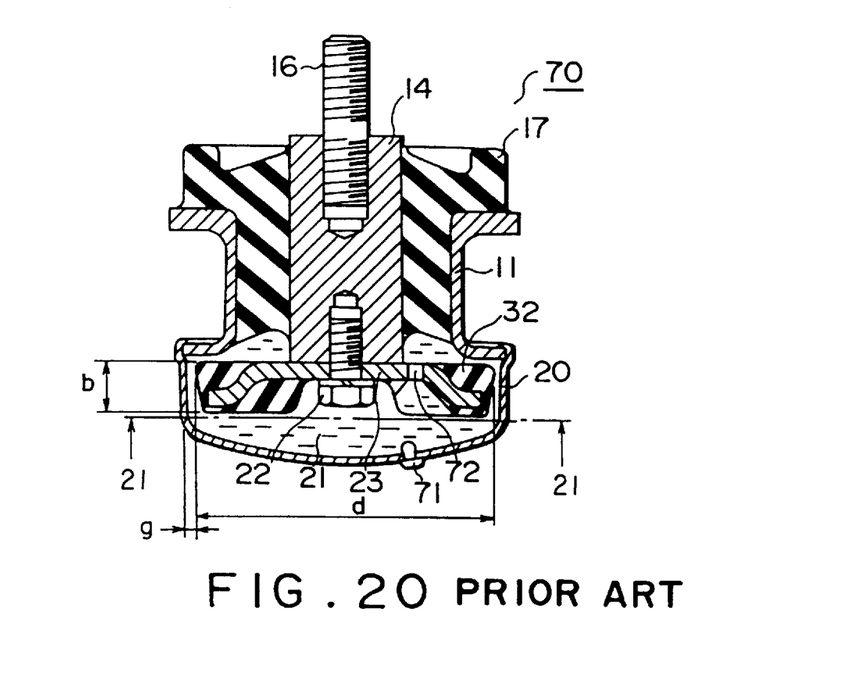
FIG. 20 is a sectional side view of a conventional viscous mount.
Figure 21:
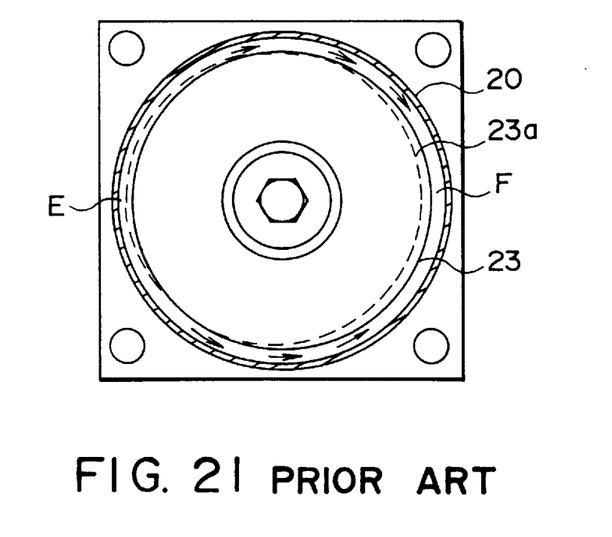
FIG. 21 is a sectional view taken on line X—X of FIG. 20.

Next, a description will be made with respect to another prior art. FIG. 20 is a sectional side view of a viscous mount (e.g., see Japanese utility model laid-open publication No. 4-101835) which is used as another liquid sealed mount, and FIG. 21 is a sectional view taken on line X—X of FIG. 20. In the viscous mount 70, a case 11 and a guide shaft 14, having a bolt 16 therein, are joined to each other by a rubber mounting element 17 having a hardness Hs of about 70°. A housing 20 containing a liquid sealing chamber is fixed to one end of the case 11, while a damper plate 23 having a rubber stopper element 32 is fastened by a bolt 22 to a lower end of the guide shaft 14 and is held in the liquid sealing chamber in the housing 20. A hole 72 is provided through the damper plate 23, and an injecting port 71 is provided in the liquid sealing chamber housing 20, whereby a high attenuation liquid 21 can be injected through the injecting port 71 into the liquid sealing chamber in the housing 20. On the other hand, the hole 72 is used to inject the high attenuation liquid 21 from the injecting port 71 into the portion of the chamber above the upper side of the damper plate 23, the high attenuation liquid 21 having a viscosity of about 50,000 to 100,000 cst.

In such a viscous mount 70, when a vertical vibration load is applied to the guide shaft 14, the damper plate 23 stirs the high attenuation liquid 21 and obtains an attenuation force to attenuate the vibration. The attenuation characteristics are indicated by the broken lines in FIG. 22, each of these lines exhibiting a relationship between frequency and loss factor for an input amplitude of ±0.2 mm or ±3.0 mm. As shown in the drawing, over a wide frequency band the loss factor of the viscous mount 70 becomes larger than that of the liquid sealed mount 60, and a resonation does not occur with respect to even the impact vibration. However, an attenuation force of the viscous mount 70, necessary for reducing vibration and noise, is small for the large input amplitude and becomes large with respect to intermediate and high frequency vibration, causing no vibration isolating effect by the viscous mount 70. This description assumes the low frequency range to be 20 Hz or less, the intermediate frequency range to be about 20 Hz to several hundred Hz, and the high frequency range to be several hundred Hz or more.

In consideration of the above drawback, even if the rubber mounting element 17 is decreased in hardness and in spring constant to improve the vibration isolating effect in the intermediate and high frequency ranges, lateral vibration can occur because the deflection with respect to a lateral load becomes large. Further, the viscous mount 70 structurally has a small attenuation action with respect to the lateral direction such that the lateral vibration occurs. This is because the attenuation force with respect to the lateral displacement appears only on a projected area of the rubber stopper element 32 having a thickness b (see FIG. 20). On the contrary, the viscous mount 70 can obtain a large attenuation force with respect to the vertical displacement, because the force appears on an area of the damper plate 23 having a diameter d (see FIG. 20). In addition, as shown in the sectional view of FIG. 21 taken along the line X—X of FIG. 20, the displacement of the damper plate 23 in a position 23a, indicated by a dotted circle, results in less attenuation force because the liquid moves smoothly along the circle from the part E to the part F as indicated by the arrows. For this reason, lateral vibration can occur more frequently; but nevertheless, in order to prevent an interference between the rubber stopper element 32 and the liquid sealing chamber housing 20, the space g cannot be made narrow. Thus, the full liquid passing area becomes large with a combination of the fully required space g and the hole 72, so that it would be further difficult to obtain a large attenuation force.

Therefore, an object of the present invention is to solve the disadvantages in such prior art and to provide a liquid sealed rubber mount capable of displaying an excellent vibration isolating effect in intermediate and high frequency ranges required for reducing vibration and noise, having, a vibration isolating effect with no resonation occurring with respect to even the impact vibration of a wide frequency band during bad road driving or the like, capable of obtaining a large attenuation force when the vibration amplitude is large, and capable of preventing the occurrence of lateral vibration.

SUMMARY OF THE INVENTION

A first aspect of the present invention is to provide a liquid sealed rubber mount of vibration isolating type which joins two separate members to each other through a cylindrical rubber mounting element and which contains a liquid sealing chamber housing, with an attenuation liquid therein, fixed to one member and a damper plate fixed to the other member, the liquid sealed rubber mount including an elastic member which can be deformed finely due to the resistance of the attenuation liquid when vertical vibration of the damper plate occurs, the elastic member being constituted by one of urethane foam having independent air bubbles therein, soft urethane-rubber, a rubber film with air sealed therein and a rubber film with a deformable, flexible material sealed therein. The elastic member can be fixed to upper and lower surfaces of the damper plate, positioned between two plates constituting the damper plate, or fixed to a surface of a rubber damper element provided under the surface of the damper plate. Alternatively, the elastic member may be fixed to surfaces formed by a combination of a rubber stopper element and a rubber damper element fixed to the upper and lower surfaces of the damper plate.

In such a structure, when intermediate and high frequency vibration, the amplitude of which is small, is applied to the damper plate, the elastic member is deformed finely, so that the damper plate is independent of the attenuation liquid, and an excellent vibration isolating action can be obtained owing, to the rubber mounting element. When low frequency vibration, the amplitude of which is large, occurs, the damper plate and the elastic member are moved unitarily, so that the vibration is attenuated due to the attenuation liquid, with no resonation occurring.

A second aspect of the present invention is to provide the liquid sealed rubber mount of vibration isolating type mentioned above in which the cylindrical rubber mounting element includes cylindrical plates positioned therein to form a laminate structure, said rubber mounting element having a hardness Hs in excess of 45° but not more than 70°. The attenuation liquid sealed in the liquid sealing chamber can have a viscosity in excess of 50,000 cst but not more than 150,000 cst.

In such a structure, the laminate type rubber mounting element has a larger spring constant in the horizontal direction so that the occurrence of lateral vibration can be prevented. The spring constant of the rubber mounting element in the vertical direction is decreased by selecting its hardness, and the rubber mounting element displays an excellent vibration isolating effect in intermediate and high frequency ranges necessary to prevent vibration and noise. Furthermore, the attenuation liquid falls in the above range of viscosity, and this makes it possible to obtain a high attenuation action in a wide frequency range with no resonation occurring with respect to even the input vibration, such as the impact vibration of a wide frequency band.

BEST NODE FOR CARRYING OUT THE INVENTION

A description will be made hereinbelow with respect to the preferred embodiments of a liquid sealed rubber mount according to the first aspect of the present invention, with reference to the accompanying drawings.

Figure 3:
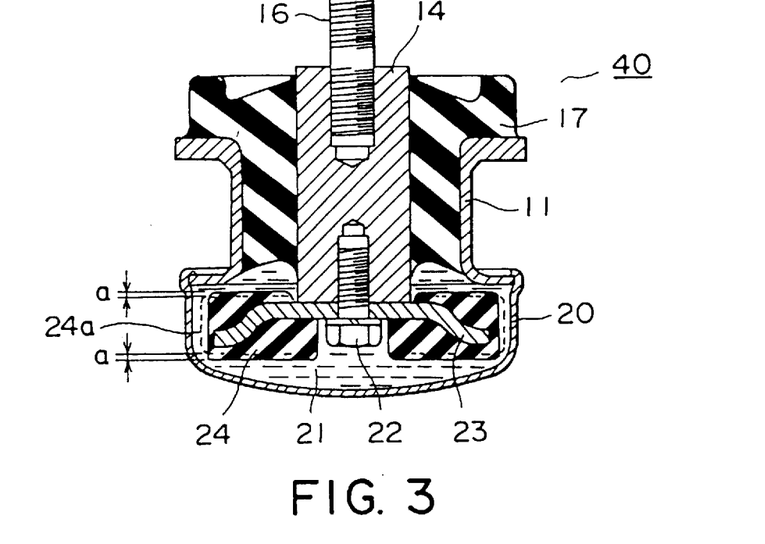
FIG. 3 is a sectional side view of a liquid sealed rubber mount of a first embodiment according to a first aspect of the present invention.

FIG. 3 is a sectional side view of the first embodiment of a liquid sealed rubber mount, in which the rubber mount 40 comprises a case 11 fastened to a bracket 4 (see FIG. 2), a liquid sealing chamber housing 20 fixed to the lower end of the case 11, a rubber mounting element 17 fixed inwardly of the case 11, and a guide shaft 14 fixed inwardly of the rubber mounting element 17. A high attenuation liquid 21 is sealed in the liquid sealing chamber housing 20. The guide shaft 14 is provided with a bolt 16 at one end for fixing to a floor 6 of a cab 5 (see FIG. 2) by tightening the bolt 16 with a nut 15, a damper plate 23 being fastened with a bolt 22 to the other end. An elastic member 24, such as urethane foam with independent air bubbles sealed therein, is fixed to the circumference of the damper plate 23 and is immersed in the high attenuation liquid 21. When vertical vibration of the damper plate 23 occurs within the liquid sealing chamber housing 20, the elastic member 24 is deformed into the elastic member 24a, shown by a dotted line, due to the resistance of the high attenuation liquid 21, with such hardness as deformed finely by the distance a.

In such a structure, the liquid sealed rubber mount 40 operates as follows: the elastic member 24 is deformed finely by the distance a, as shown by the dotted line in FIG. 3, due to the resistance of the high attenuation liquid 21 when vertical vibration of the guide shaft 14 occurs due to an external force. Accordingly, when intermediate and high frequency vibration, the amplitude of which is not more than ±a, occurs, the damper plate 23 is independent of the high attenuation liquid 21 and an excellent vibration isolating action occurs, owing to the rubber mounting element 17. On the other hand, when low frequency vibration, the amplitude of which is in excess of ±a, occurs, the damper plate 23 and the elastic member 24 are moved unitarily such that the high attenuation liquid 21 generates a resistance force with respect to a stirring action of the damper plate 23, thus obtaining an attenuation force with no resonation occurring.

Figure 4:
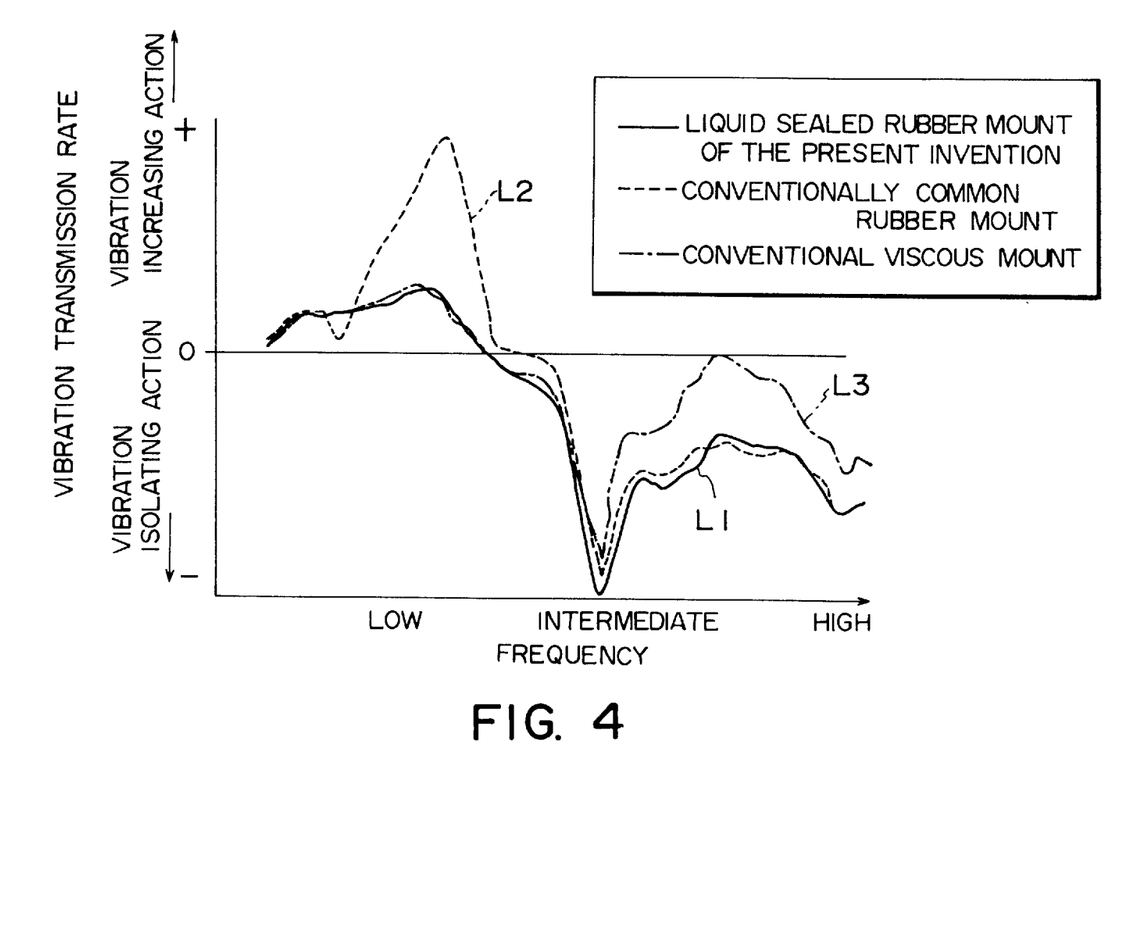
FIG. 4 is a graph showing a relationship between frequency and vibration transmission rate according to the first embodiment.

A relationship between frequency and vibration transmission rate for each of the liquid sealed rubber mount 40 and the conventional rubber mounts is shown in FIG. 4. In the drawing, the solid line L1 represents the liquid sealed rubber mount 40 according to the present invention; the broken line L2 represents a common conventional rubber mount; and the one dot chain-line L3 represents the conventional viscous mount 70 (see FIG. 20). As shown in FIG. 4, with the liquid sealed rubber mount 40 according to the present invention, such a resonant phenomenon as appears in the conventional rubber mount does not occur with respect to low frequency vibration, while a large vibration isolating action, the vibration transmission rate of which is low, occurs with respect to intermediate and high frequency vibration, compared with that of the viscous mount, thus displaying an excellent vibration isolating action.

Figure 5:
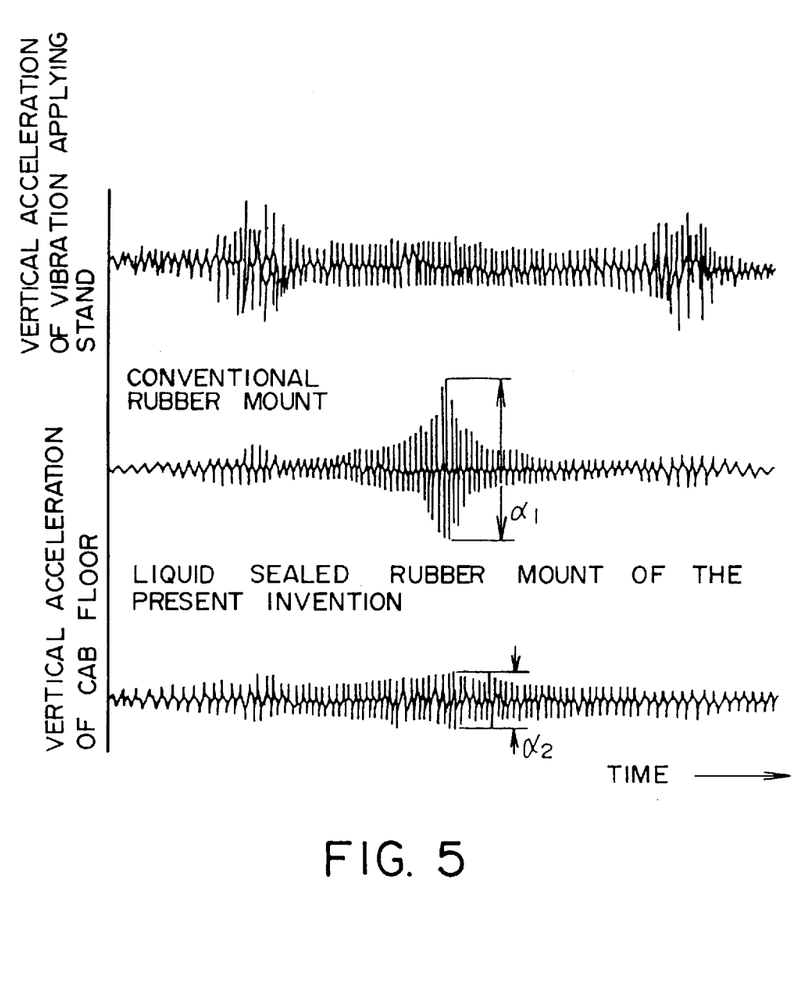
FIG. 5 is a graph showing acceleration states when the cab floor moves in a vertical direction according to the first embodiment.

Next, with the liquid sealed rubber mount 40 and the common conventional rubber mount, the results of measuring vertical acceleration of the cab floor with respect to an axis of time is shown in FIG. 5. The measurement of the vertical acceleration of the cab floor was carried out by setting the floor 6 of the cab 5 (see FIG. 2) on a vibration applying stand, not shown, through each of the liquid sealed rubber mounts processed as measured objects, and then actuating the vibration applying stand such that vibration occurs with predetermined vertical acceleration. As a result, the conventional rubber mount exhibited a maximum value of α1 on the vertical acceleration, whereas the liquid sealed rubber mount 40 of the present invention was α2 and a sharp fall in the maximum value appeared. It will be apparent from the results that the liquid sealed rubber mount 40 of the present invention can display an considerably excellent vibration isolating effect with respect to a sudden load change.

Next, a description will be made hereinbelow with respect to a second embodiment according to the first aspect of the present invention with reference to the accompanying drawings.

Figure 6:
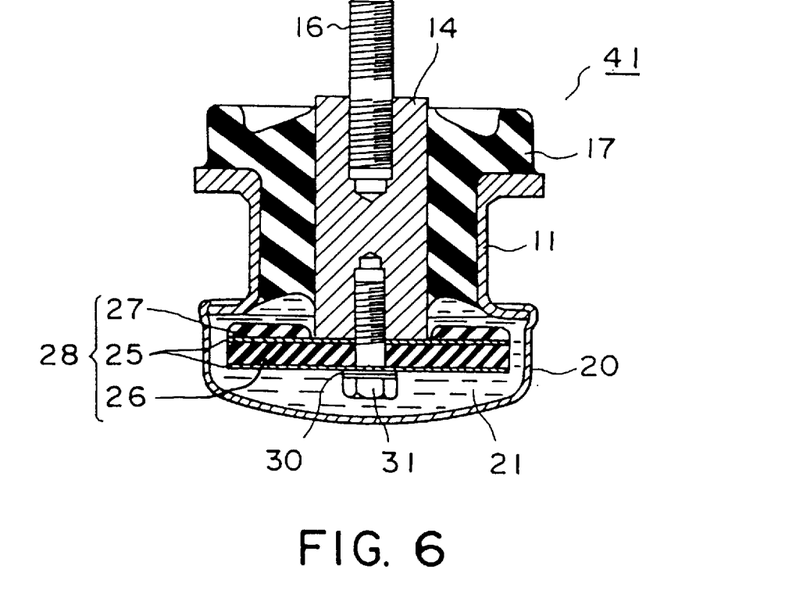
FIG. 6 is a sectional side view of a liquid sealed rubber mount of a second embodiment according to the first aspect of the present invention.

FIG. 6 shows the second embodiment of a liquid sealed rubber mount, the base structure of which is the same as that of the first embodiment but with the structure of the damper plate part being different. In FIG. 6, a liquid sealed rubber mount 41 is provided with a damper plate 28 at a low end of the guide shaft 14, the damper plate 28 being formed such that an elastic member 26, such as urethane foam, is positioned between two plates 25 and the rubber stopper element 27 is fixed to the upper surface of one plate 25. The damper plate 28 is fastened to the guide shaft 14 by a bolt 31 through a spring plate 30 and is held in the liquid sealing chamber in the housing 20. As an aside, like elements having shapes or functions identical to those of the first embodiment shown in FIG. 3 have identical reference numerals and the respective descriptions are omitted.

In such a structure, when vertical vibration is applied to the guide shaft 14, if intermediate and high frequency vibration the amplitude of which is small occurs, as similar to the first embodiment, the elastic member 26 is deformed finely due to the resistance of the high attenuation liquid 21 and is not attenuated, and an excellent vibration isolating action occurs owing to the rubber mounting element 17. On the other hand, when low frequency vibration the amplitude of which is large occurs, the plates 25 and the elastic member 26 are moved unitarily, an attenuation force of the high attenuation liquid 21 acts on the damper plate 28, resulting in the same effect as that of the first embodiment.

Figure 7:
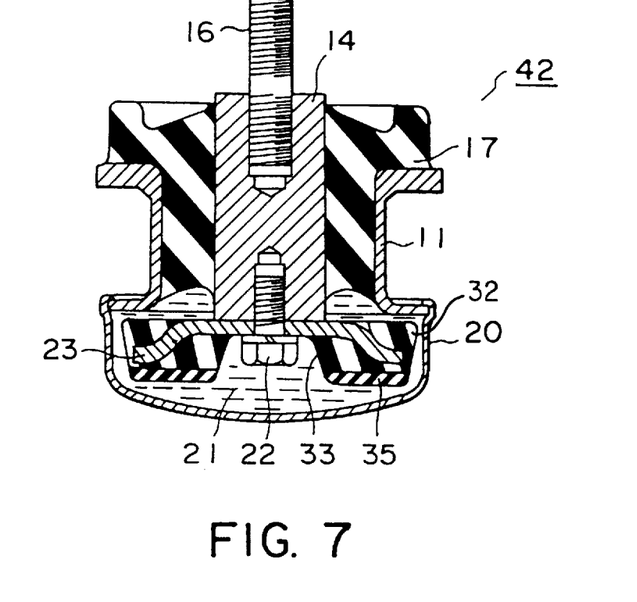
FIG. 7 is a sectional side view of a liquid sealed rubber mount of a third embodiment according to the first aspect of the present invention.
Figure 8:
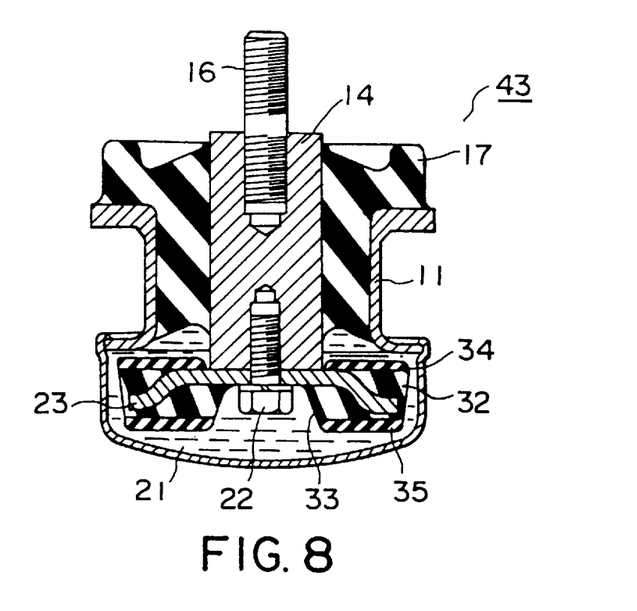
FIG. 8 is a sectional side view of a liquid sealed rubber mount of a fourth embodiment according to the first aspect of the present invention.

Referring next to drawings attached, descriptions will be made with respect to third and fourth embodiments both of which can be also applied as preferred embodiments to the first aspect of the present invention. Both embodiments have the same basic structure as the first embodiment but differ in the structure of the damper plate part. In addition, like elements having shapes or functions identical to those of the first embodiment shown in FIG. 3 have identical reference numerals and the respective descriptions are omitted.

FIG. 7 shows a liquid sealed rubber mount 42 according to the third embodiment, in which an elastic member 35, such as urethane foam, is fixed to a lower end of the rubber damper element 33 fixed to the damper plate 23. Further, FIG. 8 shows a liquid sealed rubber mount 43 according to the fourth embodiment, in which the rubber stopper element 32 and the rubber damper element 33 are fixed to the upper and lower surfaces of the damper plate 23 and, in turn, elastic members 34 and 35 are held thereon. Although the rubber stopper element 32 and the rubber damper element 33 are integrally formed into one rubber part, individual names are given, respectively, because they are slightly different in action from each other during the operating time.

In such a structure, both of the third and fourth embodiments display a vibration isolating effect with respect to the vibration from the outside during the operating time, making use of such a characteristic as the elastic members 34 and 35 are deformed finely, resulting in the same effect as that of the first embodiment.

Figure 9:
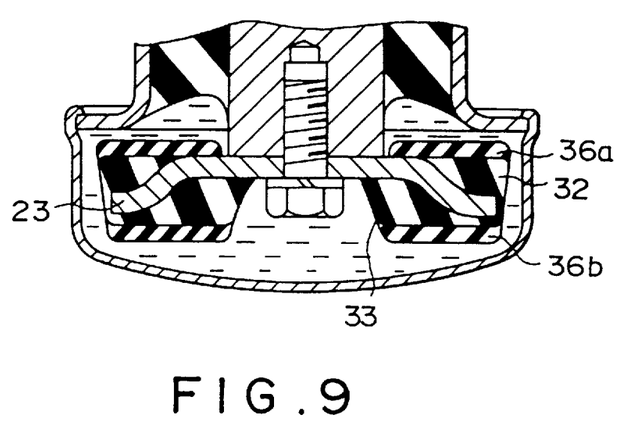
FIG. 9 is a sectional side view of an elastic member according to the first aspect of the present invention.
Figure 10:
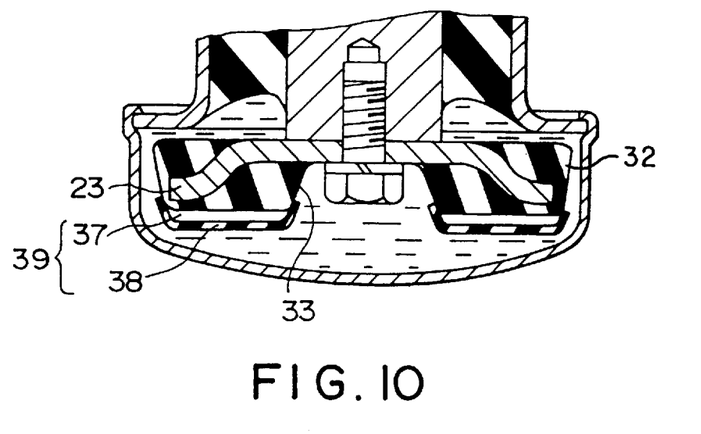
FIG. 10 is a sectional side view of another elastic member according to the first aspect of the present invention.

As such above, while the first aspect of the present invention was described in detail with respect to the preferred embodiments, the elastic members 24, 26, 34 and 35 are not limited to urethane foam with independent air bubbles sealed therein. Any other materials or forming processes can be used to provide the elastic member as long as it can be deformed by a predetermined amount. For example, soft urethane-rubber type elastic members 36*a* and 36*b* can be cured and bonded to the surfaces of the rubber stopper element 32 and the rubber damper element 33 as shown in FIG. 9. A rubber film 38 with air 37 sealed therein can also be used to form another elastic member 39, as shown in FIG. 10, the air 37 being contained in a deformable soft material such as sponge rubber or a liquid. Further, elastomers and plastics other than rubber can be used as the material of the rubber stopper element (rubber damper element). Furthermore, the damper plate and the rubber stopper element can be integrated in one part.

Next, a description will be made hereinbelow with respect to preferred embodiments of a liquid sealed rubber mount according to the second aspect of the present invention with reference to the accompanying drawings.

Figure 11:
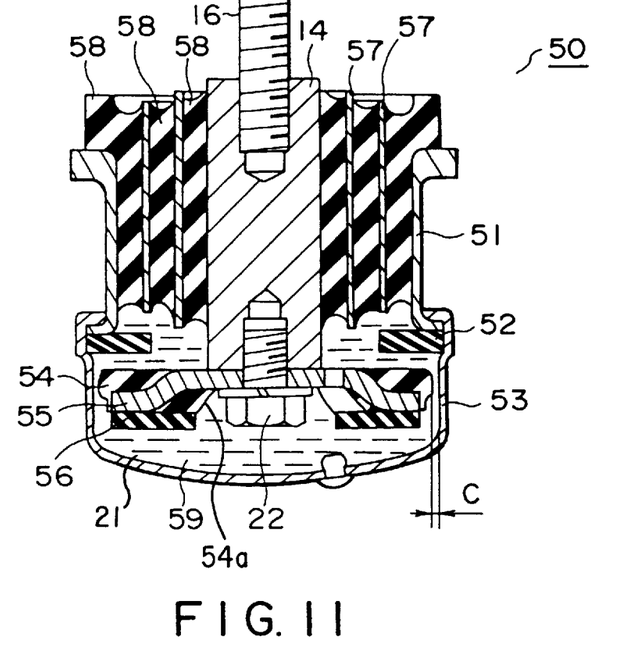
FIG. 11 is a sectional side view of a liquid sealed rubber mount of a fifth embodiment according to a second aspect of the present invention.
Figure 12:
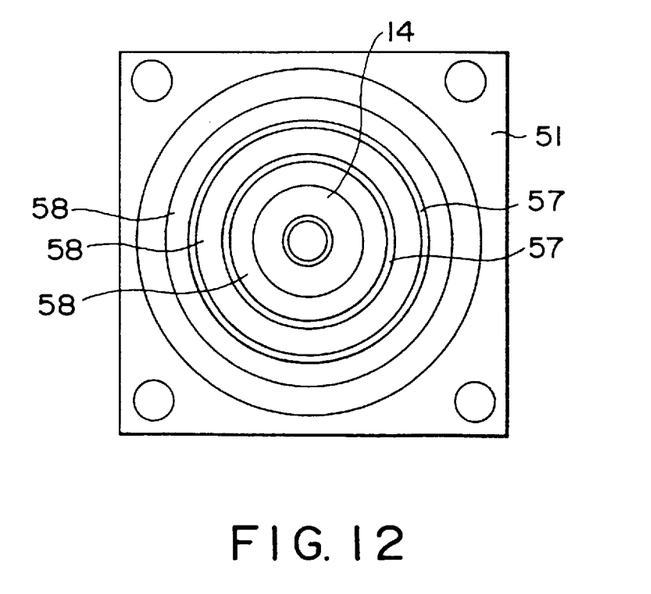
FIG. 12 is a plan view of the liquid sealed rubber mount of the fifth embodiment.

FIG. 11 is a sectional side view showing a liquid sealed rubber mount according to a fifth embodiment, and FIG. 12 is a plan view of the liquid sealed rubber mount of FIG. 11. In the liquid sealed rubber mount 50, a liquid sealing chamber housing 53, having a rubber stopper element 52 therein, is fixed to a lower end of a case 51. A damper plate 55, having a rubber stopper element 54 on part of its upper surface and a rubber damper element 54a on part of its lower surface, is held in the liquid sealing chamber housing 53 with a space c between the circumferences of the damper plate 55 and the liquid sealing chamber housing 53. An elastic member 56, such as urethane foam, is then fixed to the rubber damper element 54a. While the rubber stopper element 54 and rubber damper element 54a have been separately identified, they can be in the form of a single rubber element, as illustrated each of FIGS. 7–11. The guide shaft 14, having the bolt 16, is tightened with the nut 22 to the damper plate 55 and is joined to the case 51 by the rubber mounting element 58 having cylindrical laminate plates 57 therein, the rubber mounting element 58 having a hardness Hs of 45° to 70°. The hardness was obtained from the results of characteristic tests in which the liquid sealed rubber mount 50 is fabricated to measure values of loss factor and spring constant with respect to all kinds of load levels, the hardness having the effect of the conventional liquid sealed mount. Since rubber's hardness data generally vary to a degree (e.g., ±5°), the determination of a precise hardness range is difficult, but it would be considered that the hardness Hs of 45° to 60° preferably exhibits a larger effect. On the other hand, the liquid sealing chamber housing 53 seals therein a high attenuation liquid 59, such as a silicon liquid having a viscosity in the range of 100,000 to 150,000 cst. The viscosity was also obtained from the results of characteristic tests in the same manner as the hardness determination. It is noted that the viscosity is preferably determined in a range of 50,000 to 150,000 cst for required performance with respect to a vibration isolating or controlling action. It is also considered that a viscosity exceeding 150,000 cst is preferably used to obtain an excellent loss factor with respect to low frequency vibration described later.

In such a structure, while the relative displacement of the case 51 and the guide shaft 14 occurs due to the vibration from the road surface or the like when the vehicle starts driving, a vibration isolating action is displayed with respect to the intermediate and high frequency vibration, since the hardness of the rubber mounting element 58 is set low such that the spring constant becomes small in the vertical direction. Further, the rubber mounting element 58, having a cylindrically laminated structure with the laminate plates 57 as shown in FIG. 12, has a large spring constant in the horizontal direction so that the lateral vibration of the cab 5 (see FIG. 1) can be reduced. Furthermore, when the relative displacement of the case 51 and the guide shaft 14 occurs in the vertical direction, the damper plate 55 stirs the attenuation liquid 59 up and down within the liquid sealing chamber housing 53. The stirred attenuation liquid 59, having a high viscosity, is moved through a narrow space c, and a large attenuation force occurs. Accordingly, this liquid sealed rubber mount can display an attenuation force higher than that of the conventional viscous mount (see FIG. 20) with no resonation occurring with respect to even the input vibration such as the impact vibration of a wide frequency band.

Figure 13:
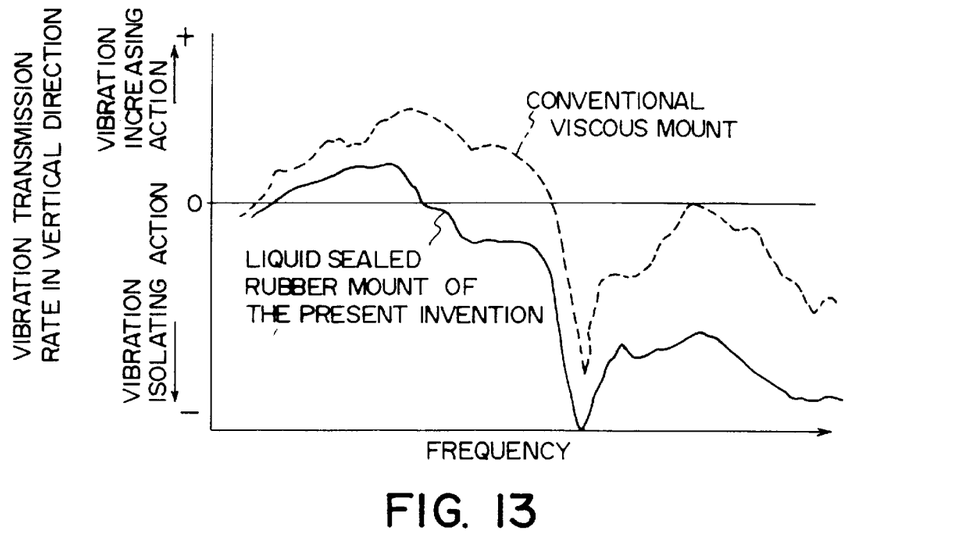
FIG. 13 is a graph showing a vibration transmission rate in the vertical direction according to the fifth embodiment.
Figure 14:
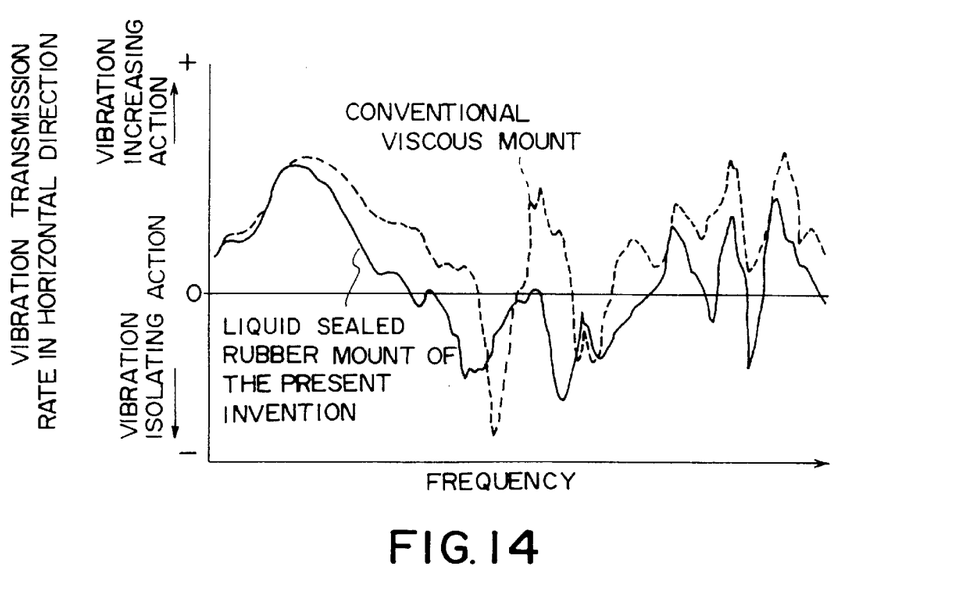
FIG. 14 is a graph showing a vibration transmission rate in the horizontal direction according to the fifth embodiment.
Figure 15:
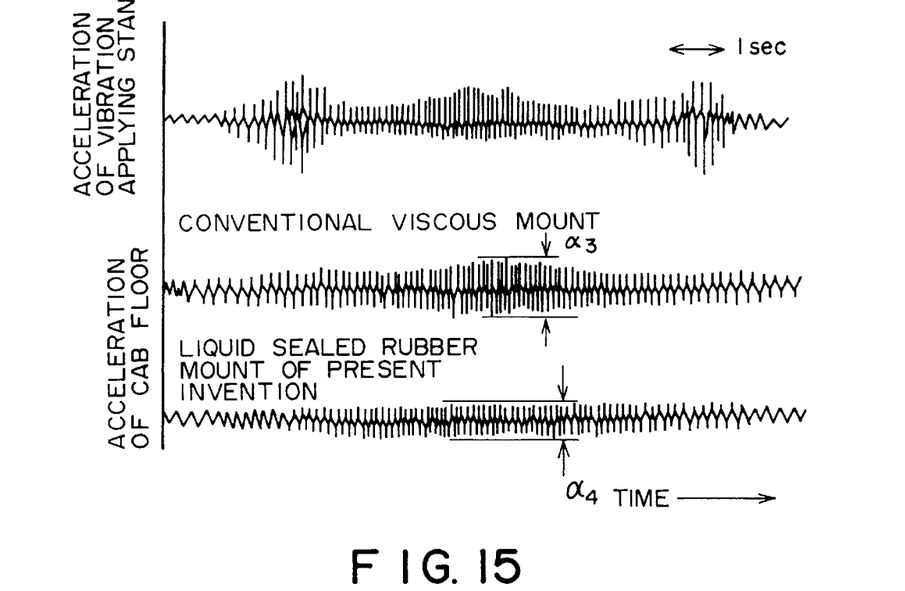
FIG. 15 is a graph showing acceleration states when resonation occurs according to the fifth embodiment.

A description will be made next with respect to characteristics of the liquid sealed rubber mount 50 according to this embodiment, with reference to FIGS. 13 to 18. FIG. 13 shows a relationship between frequency and vertical vibration transmission rate, and FIG. 14 shows a relationship between frequency and lateral vibration transmission rate. Both indicate the liquid sealed rubber mount 50 of this embodiment with solid lines and the conventional viscous mount with broken lines. In both cases, the liquid sealed rubber mount of the present invention exhibits a substantially low value in vibration transmission rate across all ranges of frequency (covering low frequency through high frequency) compared with the conventional viscous mount, thereby displaying a vibration isolating effect as well as a vertical vibration reducing effect. FIG. 15 shows a vibration wave form for each frequency variation when resonation occurs; wherein the vertical axis expresses time and the horizontal axis is acceleration. This test was performed in the same manner as the measurement illustrated in FIG. 5. As a result, as shown in the drawing, the conventional viscous mount takes a maximum value of $\alpha 3$ on acceleration when resonation occurs, whereas the liquid sealed rubber mount 50 of the present invention takes a maximum value of $\alpha 4$, resulting in drastic reduction of vibration peaks when resonation occurs. It is apparent that the liquid sealed rubber mount 50 of the present invention has an excellent vibration isolating action.

Figure 16:
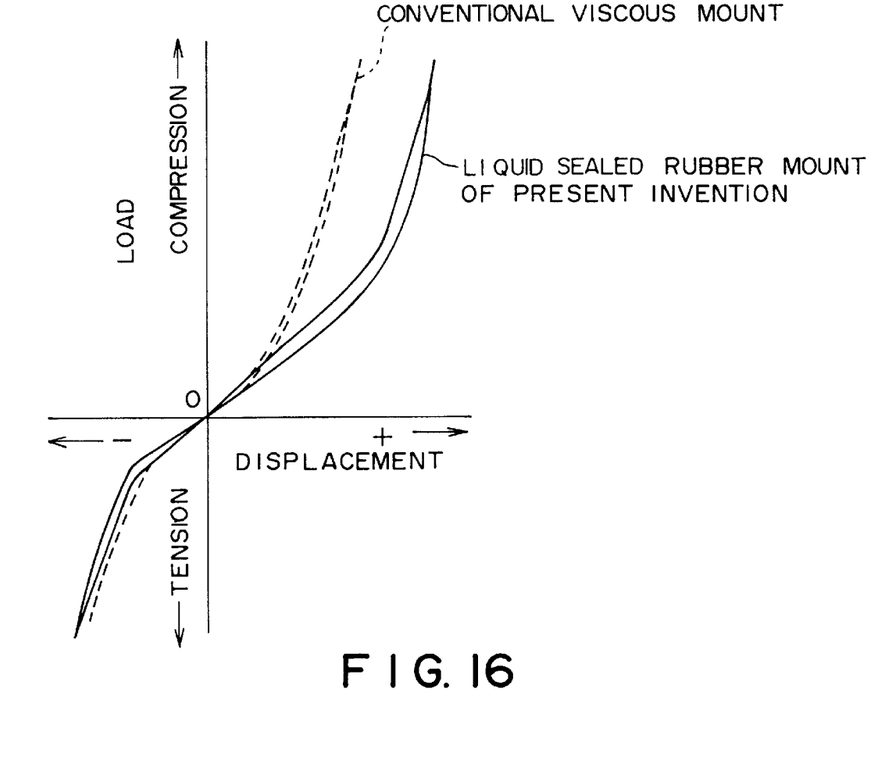
FIG. 16 is a graph showing static spring characteristics in an axial direction according to the fifth embodiment.
Figure 17:
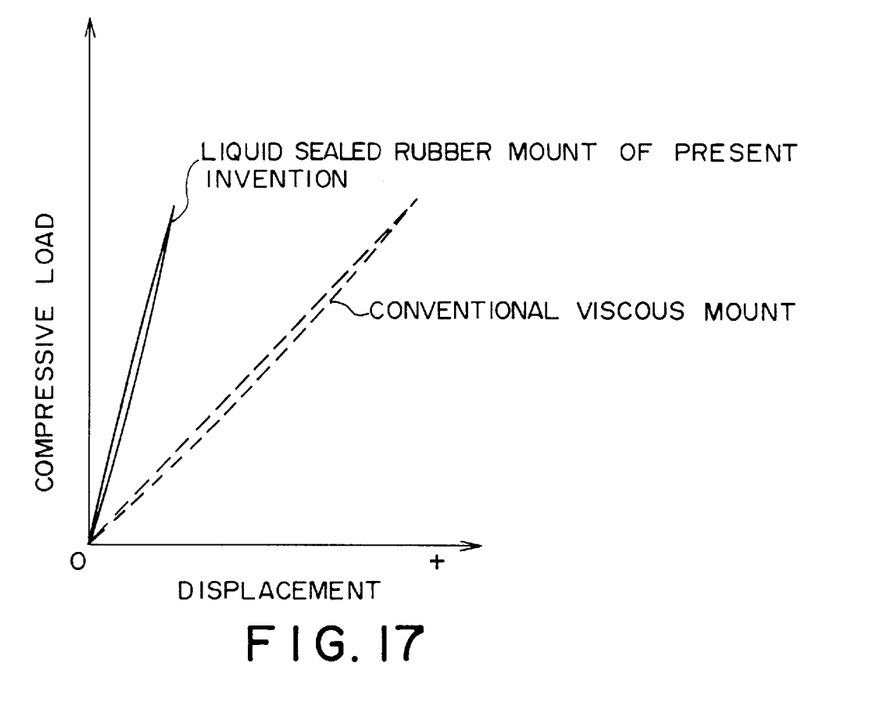
FIG. 17 is a graph showing static spring characteristics in a radial direction according to the fifth embodiment.
Figure 18:
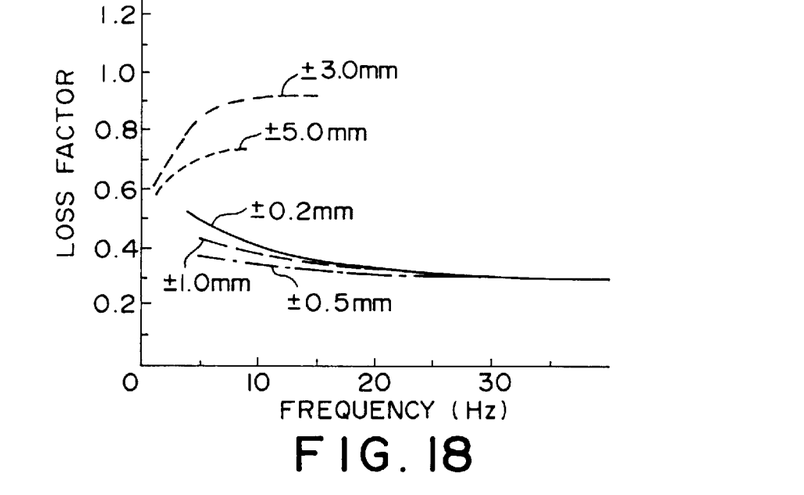
FIG. 18 is a graph showing attenuation characteristics according to the fifth embodiment.

Next, a comparison will be made with respect to static spring characteristics; FIG. 16 shows static spring characteristics in the axial direction, and FIG. 17 shows the characteristics in the radial direction. The liquid sealed rubber mount 50 of the present invention, compared with the conventional viscous mount, has a flexible spring characteristic in the vertical direction, but static in the lateral direction so that the lateral vibration can be prevented. FIG. 18 shows attenuation performance of the liquid sealed rubber mount 50 of the present invention, illustrating a relationship between frequency and loss factor with respect to five levels, the input amplitude for each level being in a range of ±0.2 mm to ±5.0 mm. As compared with the conventional viscous mount, the present inventive mount has a small loss factor for performance required with respect to reduction of noise or vibration the amplitude of which is small, so that an excellent vibration isolating action can be displayed. On the other hand, it has a large loss factor required for comfortable driving with respect to low frequency vibration, the amplitude of which is large, so that an excellent vibration controlling action can be also displayed.

INDUSTRIAL APPLICABILITY

The present invention can be effectively applied to a liquid sealed rubber mount which is used as a device for reducing vibration or noise, for example, to mount a cab on a vehicle for business use, capable of displaying an excellent vibration isolating effect in intermediate and high frequency ranges, having a vibration isolating effect with no resonation occurring with respect to even the impact vibration of a wide frequency band, capable of obtaining a large attenuation force for large amplitude vibration, and capable of preventing the occurrence of lateral vibration.

What is claimed is:

1. A liquid sealed rubber mount for isolating vibration, comprising:

a first member and a second member, said first member being separate from said second member;

a cylindrical rubber mounting element connected between said first member and said second member;

a housing having a liquid sealing chamber therein, said liquid sealing chamber containing an attenuation liquid, said housing being fixed to said first member;

a damper plate fixed to said second member, said damper plate being positioned in said attenuation liquid in said liquid sealing chamber, said attenuation liquid having a resistance to movement of said damper plate; and an elastic member secured to said damper plate;

wherein said elastic member is constituted of at least one of urethane foam having independent air bubbles, soft urethane-rubber, a rubber film with air sealed therein, and a rubber film with a deformable, flexible material sealed therein, whereby said elastic member is finely deformable by the resistance of the attenuation liquid when small amplitude vertical vibration of said damper plate occurs in the range of intermediate and high frequencies so that said damper plate is independent of said attenuation liquid, and whereby said damper plate and said elastic member are moved unitarily when large amplitude vibration occurs at a low frequency so that the vibration is attenuated due to the attenuation liquid.

2. A liquid sealed rubber mount in accordance with claim 1, further comprising a rubber element, at least a portion of said rubber element being provided under a surface of said damper plate, and wherein said elastic member is fixed to a surface of said rubber element.

3. A liquid sealed rubber mount in accordance with claim 2, wherein said elastic member comprises a rubber film with air sealed thereby.

4. A liquid sealed rubber mount in accordance with claim 2, wherein said rubber element comprises a rubber stopper element provided on an upper surface of said damper plate and a rubber damper element provided on a lower surface of said damper plate, and wherein said elastic member comprises a first elastic member fixed to an upper surface of said rubber stopper element and a second elastic member fixed to a lower surface of said rubber damper element.

5. A liquid sealed rubber mount in accordance with claim 1, wherein said elastic member is positioned between two plates constituting said damper plate.

6. A liquid sealed rubber mount in accordance with claim 5, further comprising a rubber stopper element secured to a surface of one of said two plates.

7. A liquid sealed rubber mount in accordance with claim 1, wherein said elastic member is fixed to upper and lower surfaces of said damper plate.

8. A liquid sealed rubber mount in accordance with claim 1, further comprising a rubber element secured to upper and lower surfaces of said damper plate.

9. A liquid sealed rubber mount in accordance with claim 1, wherein said elastic member comprises urethane foam having independent air bubbles therein.

10. A liquid sealed rubber mount in accordance with claim 1, wherein said elastic member comprises soft urethane-rubber.

11. A liquid sealed rubber mount in accordance with claim 1, wherein said elastic member comprises a rubber film with air sealed thereby.

12. A liquid sealed rubber mount in accordance with claim 1, wherein said elastic member comprises a rubber film with a deformable, flexible material sealed thereby.

13. A liquid sealed rubber mount in accordance with claim 1, wherein said rubber mounting element has a hardness Hs in the range of about 45° to about 70°, and wherein said attenuation liquid has a viscosity in the range of about 50,000 cst to about 150,000 cst.

14. A liquid sealed rubber mount for isolating vibration, comprising:

a first member and a second member, said first member being separate from said second member;

a cylindrical rubber mounting element connected between said first member and said second member;

a housing having a liquid sealing chamber therein, said liquid sealing chamber containing an attenuation liquid, said housing being fixed to said first member;

a damper plate fixed to said second member, said damper plate being positioned in said attenuation liquid in said liquid sealing chamber; and a combination of a rubber stopper element, a rubber damper element, and an elastic member secured to said damper plate, said attenuation liquid having a resistance to movement of said damper plate;

wherein said elastic member is constituted of at least one of urethane foam having independent air bubbles, soft urethane-rubber, a rubber film with air sealed therein, and a rubber film with a deformable, flexible material sealed therein, whereby said elastic member is finely deformable by the resistance of the attenuation liquid when small amplitude vertical vibration of said damper plate occurs in the range of intermediate and high frequencies, so that said damper plate is independent of said attenuation liquid, and whereby said damper plate and said elastic member are moved unitarily when large amplitude vibration occurs at a low frequency so that the vibration is attenuated due to the attenuation liquid.

15. A liquid sealed rubber mount in accordance with claim 14, wherein said combination is fixed to upper and lower surfaces of said damper plate.

16. A liquid sealed rubber mount in accordance with claim 14, wherein said cylindrical rubber mounting element includes cylindrical plates positioned therein to form a laminate structure.

17. A liquid sealed rubber mount in accordance with claim 14, wherein said rubber mounting element has a hardness Hs in the range of about 45° to about 70°.

18. A liquid sealed rubber mount in accordance with claim 14, wherein said attenuation liquid has a viscosity in the range of about 50,000 cst to about 150,000 cst.

* * * * *